June 16, 1959 H. W. HOLLISTER Re. 24,658

STOP BEADS IN SUSPENDED CEILINGS

Original Filed Feb. 17, 1955

INVENTOR.
HARRY W. HOLLISTER
BY
L. S. Saulsbury
ATTORNEY

United States Patent Office

Re. 24,658
Reissued June 16, 1959

24,658

STOP BEADS IN SUSPENDED CEILINGS

Harry W. Hollister, New York, N.Y., assignor to Acoustat Corporation, a corporation of New York Original No. 2,802,359, dated August 13, 1957, Serial No. 488,907, February 17, 1955. Application for reissue August 12, 1958, Serial No. 756,054

8 Claims. (Cl. 72—118)

Matter enclosed in heavy brackets [ ] appears in the original patent but forms no part of this reissue specification; matter printed in italics indicates the additions made by reissue.

This invention relates to a stop bead for plaster.

It is an object of the present invention to provide a stop bead for forming a connection between plaster and acoustic blocks used in ceilings.

It is another object of the invention to provide a stop bead for plaster adapted to provide a horizontally extending corner formation along a drop acoustic ceiling.

It is another object of the invention to provide a horizontal stop bead for plaster work which can be readily assembled into the ceiling structure and which is adapted to be attached and secured in a flatwise manner to the underface of [rock] *plaster* lath as by the mere application of the extension of a wire through the bead and through the [rock] *plaster* lath and securing the ends thereof by a twisting operation.

It is still another object of the invention to provide a stop bead which can be so assembled and used in a ceiling structure as to provide retaining means for glass walls extending to the ceiling from a dwarf partition.

It is a still further object of the invention to provide a stop bead for use in plaster ceiling structures for making a connection between vertically extending plaster and acoustic blocks having a metal pan and which are secured by suspension from special clips in the ceiling structure and wherein the stop bead has a shelf portion on which one end of the acoustic metal pan can be rested for support.

Other objects of the invention are to provide a stop bead for plaster ceiling structures which is of simple construction, inexpensive to manufacture, easily embodied in the ceiling structure, simplifies the operation of adding the plaster to the ceiling, provides support for the plaster and a trimmed horizontal edge, of pleasing appearance, compact, light in weight, durable, efficient and effective in operation.

Figure 1:
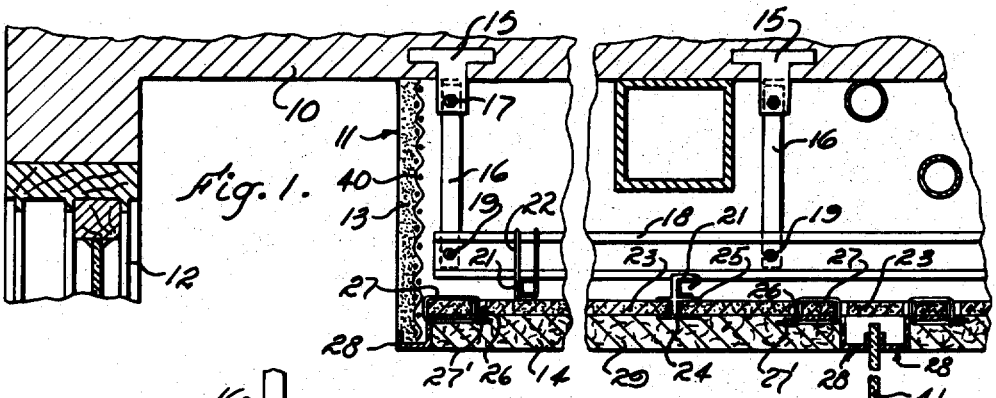
Figure 2:
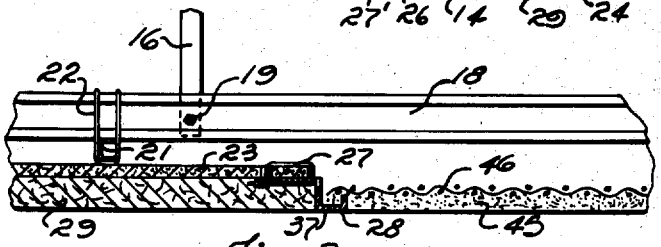
Figure 3:
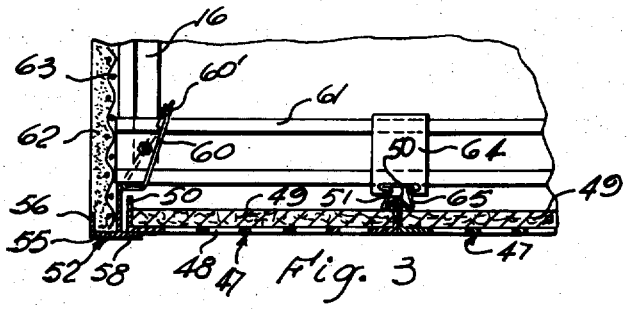
Figure 4:
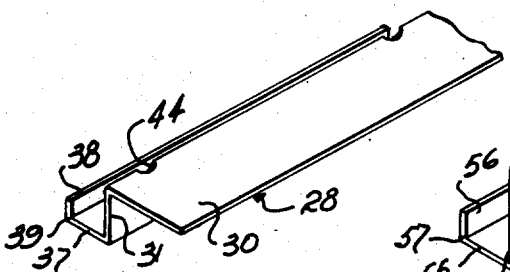
Figure 5:
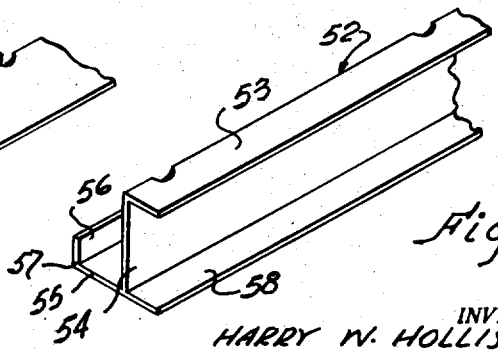

For other objects and for a better understanding of the invention, reference may be had to the following detailed description taken in connection with the accompanying drawing, in which:

Figure 1 is a vertical sectional view of a drop ceiling structure embodying the stop bead of the present invention, Fig. 2 is a fragmentary sectional view of a ceiling structure showing the stop bead used in making a connection between horizontally extending plaster and acoustic block, Fig. 3 is a fragmentary sectional view of a drop ceiling structure including a special form of stop bead adapted for supporting an acoustic block having a metal housing, Fig. 4 is a fragmentary perspective view of a stop bead used in the ceiling structures shown in Figs. 1 and 2, Fig. 5 is a fragmentary perspective view of a stop bead used in the ceiling structure shown in Fig. 3 in connection with acoustic blocks having a metal housing or pan.

Referring now particularly to Fig. 1, 10 represents a normal ceiling structure to which a drop ceiling structure indicated generally at 11 is attached and suspended therefrom to provide a concealment for pipes and ducts and at the same time providing an acoustic ceiling. This is effected in the modernization of old buildings where air conditioning and various piping has to be concealed and wherein an acoustic structure can be provided.

In effecting this arrangement of construction, the drop ceiling structure is suspended from the original ceiling and in order that it does not interfere with a window 12, the drop ceiling structure is spaced from the window as shown, and the vertical wall of the drop ceiling structure facing the window is plastered as indicated at 13. Heretofore, this has been difficult with current ceiling structure assemblies because of the need for perfecting the horizontally extending edge of the drop ceiling structure that makes union with acoustic block 14.

The drop ceiling structure 11 is connected to the ceiling 10 through embedded toggle members 15 to which drop members 16 are attached or secured by means of fastening bolts 17. To the lower ends of these drop members 16 there are connected channel carriers 18 by bolt fasteners 19. Beneath the carriers 18 and secured thereto are transversely extending rails 21 that are fastened to the carriers by U-shaped attaching clips 22.

[Rock] *Plaster* laths 23 are suspended from the transverse channel members 21 by special clips 24 longitudinally spaced across the channel members 21 and having horizontal projections or fingers 25 for receiving and supporting the edges of the [rock] *plaster* lath.

The [rock] *plaster* lath may have holes 26 through which a wire 27 can be extended for securing to the underfaces of the [rock] *plaster* lath a horizontally extending stop bead 28. The wire 27 is twisted as indicated at 27' to tightly secure the bead 28 to the [rock] *plaster* lath.

An acoustic block 29 is secured to the underface of the [rock] *plaster* lath by glue adhesive in the conventional manner.

The stop bead 28 has a horizontal portion 30 that fits flush against the [rock] *plaster* lath undersurface, a drop portion 31 and a plaster retaining portion extending laterally from the lower end of the drop portion 31, as indicated at 32, and a turned up lip 38 to form a corner 39 running along the lower edge of the drop ceiling structure 11. A metal lath or mesh 40 is extended along the front of the structure and plaster 13 is affixed thereto in the usual manner and worked into the plaster portion 37 of the bead 28, as shown in Fig. 1, whereby to form a smooth and quickly made corner formation. By the use of this bead, there is no need to perform with skill a rounded corner of the plaster, and plasterers with less skill can quickly finish off the horizontal edge of the drop ceiling structure.

Another use for the horizontal bead 28 is shown at the right side of Fig. 1 where two beads 28 are arranged and secured to the [rock] *plaster* lath in an opposing manner and spaced from each other so that an upwardly extending glass plate 41 can be disposed therebetween and retained supported in the ceiling structure and will thereby provide an inexpensive support for the upper edge of the glass plate built into the ceiling structure. These beads 21 would be secured to the [rock] *plaster* lath 23 by wires 27 with ends twisted as indicated at 27'. The glass plate 41 can serve as the upper part of a partition, while the lower part of the partition supports the lower edge of the glass plate 41 and provides a dwarf partition 42 that rests on the floor 43. These stop beads thus not only serve as a device for finishing off the horizontal edge of a ceiling structure, but also when placing the ceiling structure in an opposing manner provides a simple means for supporting the upper edge of a glass partition plate.

The wires 27 not only extend through holes 26 in the [rock] *plaster* lath but also extend through corner holes 44 in the stop bead 28. The holes 44 extend through the union of the top portion 30 and the vertical drop portion 31 of the stop bead 28.

In Fig. 2, there is shown a still further use of the stop bead and a different drop ceiling structure wherein the plaster portion of the structure runs horizontally from the acoustic block and union is made by means of a stop bead 28 between the plaster and the acoustic block. A horizontal plaster formation is connected and extended from the acoustic block by running the plaster from plaster supporting portion 37 of the bead 28 and as indicated at 45 and supported from a horizontally extending mesh 46.

In Fig. 3, there is shown a still further form of the invention wherein the ceiling structure is made to support acoustic block assemblies which have a metal pan on the underside thereof and which is perforated. This acoustic block or assembly is indicated generally at 47 and is perforated as indicated at 48. The sides of the metal pan extend upwardly above acoustic material 49 within the pan and as indicated at 50 and 51. The [rock] *plaster* lath for this drop ceiling structure does not need a [rock] *plaster* lath for the securement of the acoustic block to the superstructure. At the end of the drop structure shown in Fig. 3, a special stop bead 52 is used. This stop bead is shown in Fig. 5, and has a short horizontal top portion 53 and a relatively high vertically extending portion 54, a plaster receiving portion 55 with an upturned corner lip 56 providing a corner 57 and a horizontal portion 58 serving as a shelf on which one edge of the metal acoustic pan assembly is rested, as shown in Fig. 3. The stop bead 52 is secured by a wire 60 that is twisted at its ends as shown at 60' and to a carrier 61.

A plaster vertical wall 62 is secured to a mesh 63 and is held in and shaped at its lower end by the portion 55 of the bead 52 and the turned up lip 56.

On the carrier 61 is secured a fastening clip 64 that serves to connect transverse clip runners or rails 65 to which extensions 50 and 51 of adjacent acoustic assemblies 47 are retained.

It will thus be seen that with this drop ceiling structure the [rock] *plaster* lath of the other structures are dispensed with.

It should now be apparent that there has been provided a drop ceiling structure wherein the lower horizontal edge of the structure can be easily and quickly formed without need to shape the plaster along the edge of the structure. It should be further apparent that the stop bead can be formed to not only provide an abutment for an acoustic block edge but also by the provision of a shelf portion serve as a support for an acoustic metal pan assembly. It will be seen that these beads can be easily and readily formed and that when used in the ceiling structure provide a simple means for finishing off the edge of the structure and also it will be seen, as shown in Fig. 1, the same can serve to support the upper edge of a glass partition wall part.

While various changes may be made in the detail construction, it shall be understood that such changes shall be within the spirit and scope of the present invention as defined by the appended claims.

What is claimed is:

1. In a drop ceiling structure, frame members depending from the ceiling, a horizontal plaster stop bead and means for securing said stop bead to the under sides of the frame members, said plaster stop bead having a horizontal attaching portion fitted flush against the under sides of the frame members, a drop vertical portion secured along one side of the horizontal attaching portion and running continuously therewith, a horizontal portion extending laterally from the lower end of the drop vertical portion and running continuously therewith, said latter horizontal portion having a turned up outer lip running therewith, acoustic members secured to the frame members and lying under the horizontal attaching portions of the plaster stop bead and a plaster wall mass supported on and along the lower horizontal portion of the stop bead and said stop bead thereby serving to join the acoustic members with the plaster wall mass.

2. In a drop ceiling structure as defined in claim 1, and said stop bead having a shelf portion extending inwardly from the drop vertical portion and serving to further support the acoustic members.

3. In a drop ceiling structure as defined in claim 1, and other stop beads of the same shape arranged in opposing relationship to each other, means for securing said other stop beads to the frame members with the turned up lip portions spaced from one another to provide a recess in the ceiling structure through which a glass wall partition plate may be extended to be held against lateral displacement with respect thereto and to make the connection of the partition with the ceiling wall structure.

*4. In a drop ceiling structure, frame members depending from the ceiling, a horizontal plaster stop bead and means for securing said stop bead to the frame members, said plaster stop bead having an attaching portion by which the bead is secured to the frame members, a vertical portion depending from the attaching portion and running continuously therewith, a horizontal portion extending laterally from the lower end of the depending vertical portion and also running continuously therewith, acoustic members secured to the frame members and to one side of the plaster stop bead and a plaster wall mass supported on and along the horizontal portion of the stop bead, said stop bead thereby serving to join the acoustic members and the plaster wall mass.*

*5. In a drop ceiling structure as defined in claim 4, and said horizontal portion having a turned up outer lip running continuously therewith.*

*6. In a drop ceiling structure as defined in claim 4, and said stop bead having a shelf portion extending inwardly from the depending vertical portion and serving to support the acoustic members.*

*7. In a drop ceiling structure as defined in claim 4, and other stop beads of the same shape arranged in opposing relationship to each other, means for securing said other stop beads to the frame members with the turned up lip portions spaced from one another to provide a recess in the ceiling structure through which a glass wall partition plate may be extended to be held against lateral displacement with respect thereto and to make the connection of the partition with the ceiling wall structure.*

*8. In a drop ceiling structure, frame members depending from the ceiling, a horizontal plaster stop bead and means for securing said stop bead to the under sides of the frame members, said plaster stop bead having a horizontal attaching portion fitted flush against the under sides of the frame members, a drop vertical portion secured along one side of the horizontal attaching portion and running continuously therewith, a horizontal*

*portion extending laterally from the lower end of the drop vertical portion and running continuously therewith, acoustic members secured to the frame members and lying under the horizontal attaching portions of the plaster stop bead and a plaster wall mass supported on and along the lower horizontal portion of the stop bead and said stop bead thereby serving to join the acoustic members with the plaster wall mass.*

References Cited in the file of this patent or the original patent

UNITED STATES PATENTS

| | | |
|---|---|---|
| 1,708,688 | Baum | Apr. 9, 1929 |
| 1,728,461 | Wolcott | Sept. 17, 1929 |
| 2,160,794 | Price | May 30, 1939 |
| 2,659,807 | Wakefield | Nov. 17, 1953 |